United States Patent
Keller

[11] 3,757,527
[45] Sept. 11, 1973

[54] WAVE DEFLECTING DEVICE FOR A SEA WALL

[75] Inventor: Daniel Franklin Keller, Wilmette, Ill.

[73] Assignee: Keller-Dee Research and Development Corp., Northbrook, Ill.

[22] Filed: Feb. 14, 1972

[21] Appl. No.: 226,053

[52] U.S. Cl. .............................. 61/49, 61/4, 61/60
[51] Int. Cl. .................................... E02b 3/20
[58] Field of Search ..................... 61/6, 14, 15, 60, 61/61, 62, 1 R, 1 F, 2, 3, 4, 39, 49, 5; 52/60, 169

[56] References Cited
UNITED STATES PATENTS

| | | | |
|---|---|---|---|
| 1,947,151 | 2/1954 | Caples | 61/49 |
| 3,247,673 | 4/1966 | Schneller | 61/39 |
| 2,219,992 | 10/1940 | Hanson | 52/60 |
| 2,865,180 | 12/1958 | Nielson | 61/49 |
| 1,971,324 | 8/1934 | Weber | 61/39 |
| 3,490,239 | 1/1970 | Vincent | 61/4 |
| 3,405,485 | 10/1968 | Edwards | 52/60 |
| 1,893,003 | 1/1933 | Schlueter | 61/4 |
| 3,488,902 | 1/1970 | Gobel | 52/60 |

Primary Examiner—David J. Williamowsky
Assistant Examiner—Conrad L. Berman
Attorney—Carlton Hill, J. Arthur Gross and James Van Santen et al.

[57] ABSTRACT

A wave deflecting device for use on a sea wall which has an undulating surface of vertically extending ridges and trough-like depressions characterized by a plate being disposed in each of the troughs on a plane extending between a horizontal plane and a vertical plane to block and to deflect an upward flow of water in the trough back to the body of water. Preferably the plate is used with a sea wall which is formed of sheet metal pilings which wall has a cap at the upper edge of the wall and has a filling material such as concrete disposed between the cap and the plates. In one embodiment the plate is provided with edge portions diverging from one end which conform to the diverging side walls of the trough and is provided with lateral portions along the edge portion to extend into the lateral portions of the trough. Another embodiment of the invention provides lateral extending portions at the other end to overlie portions of the adjacent ridges to deflect water that is moving upwardly along the ridges back to the body of water.

13 Claims, 6 Drawing Figures

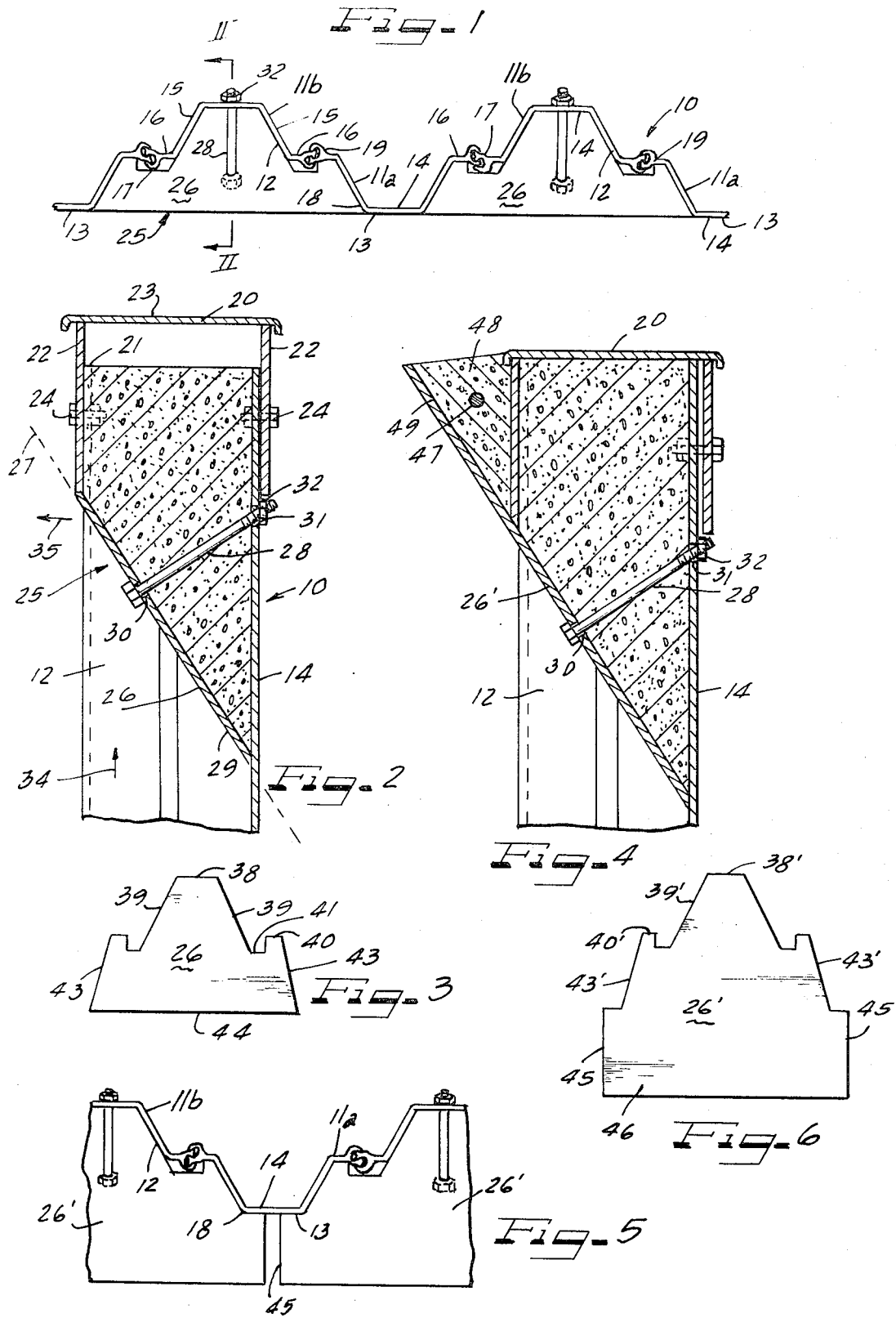

3,757,527

WAVE DEFLECTING DEVICE FOR A SEA WALL

BACKGROUND OF THE DISCLOSURE

1. Field of the Invention

The present invention is directed to a wave deflecting device utilized in a wall for protecting a structure from action of a body of water, such as the sea wall.

2. Prior Art

To protect a structure such as a jetty, pier, or to protect a portion of a shoreline from wave action on a body of water, a wall such as a sea wall is utilized. One structure for sea walls is formed of a series of interlocking metal pilings which are driven into the ground and provide a continuous undulating wall of vertically extending ridges and troughs. To complete the structure, a cap is provided on the upper edge to cover the ends of the pilings and to provide a horizontal surface for the wall. When a wave hits such a structure, the water splashes upward and is carried by the troughs into the cap area with sufficient force that it is able to be deposited on the opposite side of the sea wall. When wall is used to protect a shoreline, the collection of the water that is able to pass through the wall as waves hit the device is undesirable.

SUMMARY OF THE INVENTION

The present invention is directed to a wave deflecting device for a wall and a wall having the wave deflecting device. The wave deflecting device is a plate mounted in each of the troughs of the sea wall with a flat surface of the plate lying on a first plane extending between a horizontal plane and vertical plane of the wall. The plate is provided with a configuration to substantially conform to the cross section of the trough taken on the first plane so to block passage of water moving in the trough and to deflect the upwardly moving water in the trough which is caused by a wave back towards the body of water. One embodiment of the invention includes a lateral portion at one end of the plate which overlie adjacent ridges to deflect water moving upwardly therealong back to the body of water. Each of the plates is provided with attachment means for mounting the plate in the trough of the wall on said first plane.

BRIEF DESCRIPTION OF THE DRAWINGS

FIG. 1 is a plan view of a wall having a cap removed therefrom and being provided with the deflecting plates of the present invention;

FIG. 2 is a cross section taken along lines II—II of FIG. 1 of the present invention with the cap and filler material present;

FIG. 3 is a plan view of a plate of the present invention;

FIG. 4 is a cross-sectional view of a wall having an embodiment of the present invention;

FIG. 5 is a plan view of the wall of FIG. 4 with the cap and filler material removed; and FIG. 6 is a plan view of the plate of the embodiment of FIGS. 4 and 5.

DESCRIPTION OF THE PREFERRED EMBODIMENTS

The principles of the present invention are particularly useful when utilized in a wall such as a sea wall generally indicated at 10 in FIGS. 1 and 2. The wall 10 is used to protect a structure such as a pier, jetty or a shoreline from wave action occurring in a body of water. In recent years, it has been proposed to build the wall 10 by utilizing interlocking sheet metal pilings 11 which provide a continuous undulating surface facing the body of water which surface comprises a plurality of vertically extending troughs or depressions 12 separated by vertically extending ridges 13.

The pilings used to construct the wall 10 may have various shapes. The pilings 11 are an illustrative example of one type of piling used to construct protective walls. Each of the pilings 11 has a base portion 14 with side walls 15 diverging therefrom. Each of the side walls 15 terminates in a flange 16 having an interlocking groove or eye 17.

An illustrative example of an arrangements of the pilings 11 to form the wall 10 is shown in FIG. 1 with the base portions 14 of adjacent pilings 11 on opposite sides of the wall 10. Thus the base portions 14 of pilings 11a form the ridges 13 and the portion 14 of pilings 11b form the base of the troughs 12. The side walls of the troughs 12 are formed by the side walls 15 of the pilings 11a and 11b and diverge from the base 14 of the pilings 11b to a mouth 18 which is defined by the base portions 14 of the pilings 11a. The interlocking grooves 17 and flanges 16 of the piling provide a lateral offset 19 in the side wall of the trough 12 which is approximately located halfway between the base and mouth 18 of the trough.

To complete the wall 10, a crown or cap 20 (FIG. 2) is mounted on the upper edge 21 of the wall which edge is formed by the ends of the pilings 11. The cap 20 may be a single member or, as illustrated, may be made of a pair of side walls 22 welded to a top member 23. The cap 20 is secured to the edge 21 of the wall 10 by suitable means such as by welding or by bolts 24. As illustrated, there is some spacing between the top member 23 and the upper edge 21 of the wall which spacing compensates for slight differences in the vertical height of the end of the pilings 11 forming the edge 21.

When a wave strikes the wall 10, the force of impact forces water to move upwardly in the troughs 12 into the cap 20 which with any clearance will allow water to pass over the edge 21 to the other side of the wall 10. While the wall 10 has protected the structure, such as a shoreline from wave action, the passing of water between the cap 20 and edge 21 causes the collecting of water on the other side of the wall, such as the land side, sand is undesirable in many instances.

To prevent or limit the passing of water through the wall 10, the present invention provides a wave deflecting device generally indicated at 25 which includes a plate 26 mounted in each of the troughs 12 to block the passage of upwardly moving water therein and to deflect the water back toward the body of water. The plate 26 is cut with a configuration to conform to a cross section of trough 12 taken on a plane 27 which is between a vertical plane and horizontal plane of the wall 10 and the plane 27 forms an angle with the vertical plane of base portion 14 of approximately 30°.

The device 24 includes means 28 for mounting the plate 26 in the trough 12 with a flat surface 29 of the plate lying on the plane 27. The mounting means 28 is illustrated as a bolt extending through an aperture 30 in the plate 26 and an aperture 31 in the back portion 14 of the trough 12. To compensate for the angle of the bolt with the back portion 14, a nut 32 with a biased washer is utilized to complete the mounting connection. As illustrated in FIG. 2, the device 25 preferably includes providing a filling material 33, such as cement, between the cap 20 and each plate 26.

With the plate 26 mounted in a trough 12, upward movement of water in the trough 12 as indicated by arrow 34 is blocked before the water reaches cap 20. When the water moving in direction 34 strikes the surface 29 of plate 26, the water will be deflected outwardly from the wall 10 in a direction indicated by arrow 35 back toward the body of water.

As best illustrated in FIG. 3, the plate 26 has an end 38 having a width substantially equal to the inner surface of the base portion 14 forming the base of the trough 12. Extending from the end 38 are a pair of edges 39 which diverge at an angle to the end 38 which angle is complementary to the angle between the back portion 14 and side walls 15 lying in plane 27. To provide for the lateral offset portion 19 in the trough 12 formed by the flanges 16 and the interlocking groove 17 of the pilings 11, the edge 39 has a laterally extending portion 40 including a notch 41 which notch provides clearance for the interlocking grooves 17. From the lateral extending portion 40, each of the edges 39 has a second edge portion 43 which extends at an angle which is complementary to an angle on plane 27 which is formed by the extension of the side wall at the trough 12 formed by the side wall 14 of the pilings 11a to the mouth 18. The edge portion 43 terminates at the other end in an edge 44 which is parallel to edge 38. The plate 26 is cut from sheet material such as half-inch steel plate by a conventional cutting process such as flame cutting.

Another embodiment of the invention is illustrated in FIGS. 4, 5 and 6 and comprises a plate 26' having an end 38' with side edges 39' diverging therefrom and provided with a first offset 40' and a second edge portion 43' which provides a configuration similar to plate 26. The plate 26' is provided with second lateral offset portions 45 which are spaced from edge 38' a distance equal to the distance between edges 38 and 44. The second offset portion 45, 45 provide a rectangular extension or plate portion 46 extending outwardly from the mouth 18 of the wall 10 (as illustrated in FIG. 5). The offset portion 45 of the rectangular portion overlie a portion of the adjacent ridge 13 to limit or stop the upward flow of water caused by the wave action and to deflect the upward flow back toward the body of water.

The rectangular shaped extension 46 as illustrated in FIG. 4 increases the effective height of the wall 10 by deflecting across the entire surface an upwardly moving wave in the direction of the arrow 35 back toward the body of water. Preferably, a portion between the crown 20 and the extension 46 is filled with a filler material such as concrete or cement which is illustrated as reinforced with reinforcing rods 47 to provide a continuous lip 48 having a lower surface 49 in the plane 27. The deflecting plate 26' is mounted in the same manner as plate 26.

In mounting either the plate 26 or 26' on the wall, they are mounted at an angle to the wall portion 14 to be in plane 27. As illustrated, plane 27 forms an angle at approximately 30° with portion 14 and provides a desirable deflection angle. However, the 30° angle is just an example of the angle that can be used.

In describing the embodiments of the deflecting plates 26 and 26', a wall constructed of the sheet metal pilings having the shape of the pilings 11 was described. However, if a narrow wall were desired, the sheet metal pilings can be arranged with the portion 14 lying all on one side so that the trough 12 is formed by the portion 14 and side walls 15 with the flanges 16 and the interlock grooves 17 forming the ridges 13. In such an arrangement, a baffle plate requires only the end portion 38 and the side portion edges 39 with the portion 40 and notch 41 providing an overlap to overlie the adjacent ridge portions. Another type of piling utilized in forming protective walls has a Z-shape which when joined together provide a wall of troughs and ridges similar to the above-described wall. In providing wave deflecting devices for these walls, the plate is shaped to conform to the cross sectional of the trough taken on a mounting plane for the plate, which plane extends between the vertical plane and horizontal plane. Thus, the plate has a configuration to conform to the cross section of the pilings forming the wall and the only requirement is that the length of the edge portion such as 39 extending from the end 38 is greater than the depth of the trough or width of its side walls.

Although minor modifications might be suggested by those versed in the art, it should be understood that I wish to embody within the scope of the patent granted hereon all such modifications as reasonably and properly come within the scope of my contribution to the art.

I claim:

1. A wave deflecting device for a vertically extending wall used in protecting a structure from a body of water, the wall having a continuous undulating surface with vertically extending ridges and troughs facing the body of water, said device comprising a plate having at least one flat surface and a configuration to substantially conform to a cross section of one of the vertically extending troughs of the wall taken on a first plane extending between the vertical plane and horizontal plane, said plate having means for mounting the plate on the wall with the flat surface lying on said first plane to block the vertically extending trough so that water forced upwardly in the trough by a wave is deflected outwardly back to the body of water.

2. A wave deflecting device according to claim 1, wherein each of said troughs has a base with side walls extending to a mouth and said plate has one end having a width substantially equal to the base with edges extending from said end having a length greater than the depth of the side wall.

3. A wave deflecting device according to claim 2, wherein the plate has at the other end laterally extending portions for overlying portions of adjacent ridges to deflect water moving upwardly therealong back to the body of water.

4. A wave deflecting device according to claim 1, wherein the each of said troughs has a base with side walls diverging from the base to form a mouth of the trough, and wherein the deflecting plate has one end of the width substantially equal to the base and edges extending from said one end at an angle thereto to conform to the side walls as the plate is mounted in the trough.

5. A wave deflecting device according to claim 4, wherein the edges extending from said one end terminate in lateral offset portions at a distance greater than the depth of the trough so that the lateral offset portions overlie adjacent ridges to deflect water moving upwardly therealong back to the body of water.

6. A wave deflecting device according to claim 4, wherein the side walls of each of said troughs have a lateral offset between the base and the mouth, and wherein the deflecting plate includes lateral offset portions conforming to the lateral offset portions of the side walls to block the trough from adjacent the lateral offset portion of the side wall to the mouth.

7. A wave deflecting device according to claim 6, wherein the deflecting plate includes a second set of lateral offset portions adjacent the opposite end to overlie portions of the adjacent ridges to deflect water moving upwardly along the ridges back toward the body of water.

8. In a substantially vertically extending wall for protecting a structure from wave action of a body of water, said wall having a continuous undulating surface of vertically extending troughs and ridges formed by interlocking sheet metal pilings facing the body of water and have a cap disposed along the top of the wall, each of said troughs having a base and a pair of said walls extending to a mouth of the trough which extend between adjacent ridges, an improvement of a wave deflecting device comprising a plate mounted in each of the vertically extending troughs adjacent the cap, each of said plates having one end conforming to the base of the trough with the sides of the plate adjacent said one end conforming to the side walls of the trough when the plate is disposed in the trough on a first plane extending between a vertical plane and a horizontal plane, said plate having at least one flat surface and means for mounting the plate in the trough with the flat surface arranged to lie on said first plane to block and deflect the passage of water moving upwardly in the vertically extending trough back to the body of water.

9. In a wall according to claim 8, wherein each of said plates at a distance from said one end greater than the depth of the trough have laterally extending offset portions for overlying a portion of the adjacent ridges to deflect water moving upwardly along the ridges back to the body of water.

10. In a wall according to claim 8, wherein the side walls of each of the troughs diverge at an angle to the base and wherein the edges of the plate adjacent said one end diverge at an angle complementary to the side walls when the plate is mounted in the trough to lie on said first plane.

11. In a wall according to claim 10, wherein the side walls of the trough have a lateral offset between the base and the mouth and wherein the deflecting plate is provided with lateral offset so that its configuration conforms to the configuration of the trough when the plate is mounted on said first plane therein.

12. In a wall according to claim 11, wherein each of the deflecting plates has a second set of laterally offset portions adjacent the opposite end to overlie portion of the adjacent ridges to deflect water moving upwardly along the ridges back toward the body of water.

13. In a wall according to claim 8, wherein the wave deflecting device include a filling material disposed in each of the troughs between the cap and the plate.

* * * * *